(12) United States Patent
Wright et al.

(10) Patent No.: US 11,926,101 B2
(45) Date of Patent: Mar. 12, 2024

(54) AGENT COMPOSITION DETERMINATION BASED ON THERMAL VALUES

(71) Applicant: Hewlett-Packard Development Company, L.P., Spring, TX (US)

(72) Inventors: Jacob Wright, San Diego, CA (US); Matthew A. Shepherd, Vancouver, WA (US); Vanessa Verzwyvelt, Vancouver, WA (US); Xin Cheng, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 98 days.

(21) Appl. No.: 17/418,791

(22) PCT Filed: May 3, 2019

(86) PCT No.: PCT/US2019/030724
§ 371 (c)(1),
(2) Date: Jun. 26, 2021

(87) PCT Pub. No.: WO2020/226608
PCT Pub. Date: Nov. 12, 2020

(65) Prior Publication Data
US 2022/0097309 A1 Mar. 31, 2022

(51) Int. Cl.
*B29C 64/393* (2017.01)
*B29C 64/165* (2017.01)
(Continued)

(52) U.S. Cl.
CPC .......... *B29C 64/393* (2017.08); *B29C 64/165* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| 7,879,282 B2 | 2/2011 | Hopkinson et al. |
| 8,167,999 B2 | 5/2012 | Alam et al. |
| (Continued) | | |

FOREIGN PATENT DOCUMENTS

| WO | WO-2017174112 A1 | * 10/2017 | ........... B29C 64/165 |
| WO | WO-2017194124 A1 | 11/2017 | |
| WO | WO-2017194126 A1 | * 11/2017 | ........... B29C 64/165 |

*Primary Examiner* — Yung-Sheng M Tsui
(74) *Attorney, Agent, or Firm* — Michael Dryja

(57) ABSTRACT

According to examples, an apparatus may include a processor and a memory on which are stored machine-readable instructions that when executed by the processor, may cause the processor to identify a property of a portion of a three-dimensional (3D) part to be fabricated and determine, based on the identified property, a thermal value associated with the portion. The instructions may also cause the processor to, based on the determined thermal value, determine a first agent composition to be used to fabricate the portion and determine a second agent composition to be used to fabricate a section external and adjacent to the portion, in which the first agent composition and the second agent composition may be determined to cause the portion and the external section to be fabricated to have the identified property while maintaining the external section separate from the portion.

14 Claims, 5 Drawing Sheets

(51) Int. Cl.
  *B33Y 10/00* (2015.01)
  *B33Y 30/00* (2015.01)
  *B33Y 50/02* (2015.01)

(56) References Cited

U.S. PATENT DOCUMENTS

| | | |
|---|---|---|
| 2018/0001567 A1 | 1/2018 | Juan et al. |
| 2018/0009171 A1 | 1/2018 | Donovan et al. |
| 2018/0022923 A1 | 1/2018 | Emamjomeh et al. |
| 2018/0111320 A1 | 4/2018 | Zhao et al. |
| 2018/0133957 A1 | 5/2018 | Ramirez Muela et al. |
| 2019/0030797 A1 | 1/2019 | Ge et al. |
| 2019/0091936 A1 | 3/2019 | Fornos et al. |

\* cited by examiner

300

```
┌─────────────────────────────────────────────┐
│ IDENTIFY A PROPERTY AND A GEOMETRY OF A PORTION │
│         OF A 3D PART TO BE FABRICATED        │
│                     302                      │
└─────────────────────────────────────────────┘
                      │
                      ▼
┌─────────────────────────────────────────────┐
│  DETERMINE A THERMAL VALUE ASSOCIATED WITH THE │
│   PORTION BASED ON THE IDENTIFIED COLOR AND  │
│                   GEOMETRY                   │
│                     304                      │
└─────────────────────────────────────────────┘
                      │
                      ▼
┌─────────────────────────────────────────────┐
│   SELECT A FIRST COMPOSITION OF AGENTS TO BE │
│    APPLIED ONTO BUILD MATERIAL PARTICLES TO  │
│  FABRICATE THE PORTION TO HAVE THE IDENTIFIED│
│             PROPERTY AND GEOMETRY            │
│                     306                      │
└─────────────────────────────────────────────┘
                      │
                      ▼
┌─────────────────────────────────────────────┐
│  SELECT A SECOND COMPOSITION OF AGENTS TO BE │
│  APPLIED ONTO BUILD MATERIAL PARTICLES IN AN │
│               EXTERNAL SECTION               │
│                     308                      │
└─────────────────────────────────────────────┘
```

FIG. 3

NON-TRANSITORY COMPUTER READABLE MEDIUM
400

IDENTIFY, IN A 3D MODEL, AN INTENDED PROPERTY AND A GEOMETRY OF A PORTION OF A 3D PART TO BE FABRICATED CORRESPONDING TO THE 3D MODEL
402

DETERMINE A THERMAL VALUE ASSOCIATED WITH THE PORTION BASED ON THE IDENTIFIED PROPERTY AND INTENDED GEOMETRY
404

SELECT A FIRST COMPOSITION OF AGENTS TO BE APPLIED ONTO BUILD MATERIAL PARTICLES TO FABRICATE THE PORTION
406

SELECT A SECOND COMPOSITION OF AGENTS TO BE APPLIED ONTO BUILD MATERIAL PARTICLES IN AN EXTERNAL SECTION THAT IS ADJACENT TO THE PORTION
408

*FIG. 4*

AGENT COMPOSITION DETERMINATION BASED ON THERMAL VALUES

BACKGROUND

In three-dimensional (3D) printing, an additive printing process may be used to make three-dimensional solid parts from a digital model. Some 3D printing techniques are considered additive processes because they involve the application of successive layers or volumes of a build material, such as a powder or powder-like build material, to an existing surface (or previous layer). 3D printing often includes solidification of the build material, which for some materials may be accomplished through use of heat and/or a chemical binder.

BRIEF DESCRIPTION OF THE DRAWINGS

Features of the present disclosure are illustrated by way of example and are not limited in the following figure(s), in which like numerals indicate like elements, in which:

FIG. 3 depicts a flow diagram of an example method for selecting compositions of agents to be applied to fabricate a 3D part based on thermal values; and FIG. 4 shows a block diagram of an example computer readable medium that may have stored thereon machine readable instructions that when executed by a processor, may cause the processor to select compositions of agents for a portion and an external section of a 3D part based on a determined thermal value associated with the portion.

DETAILED DESCRIPTION

Figure 1:
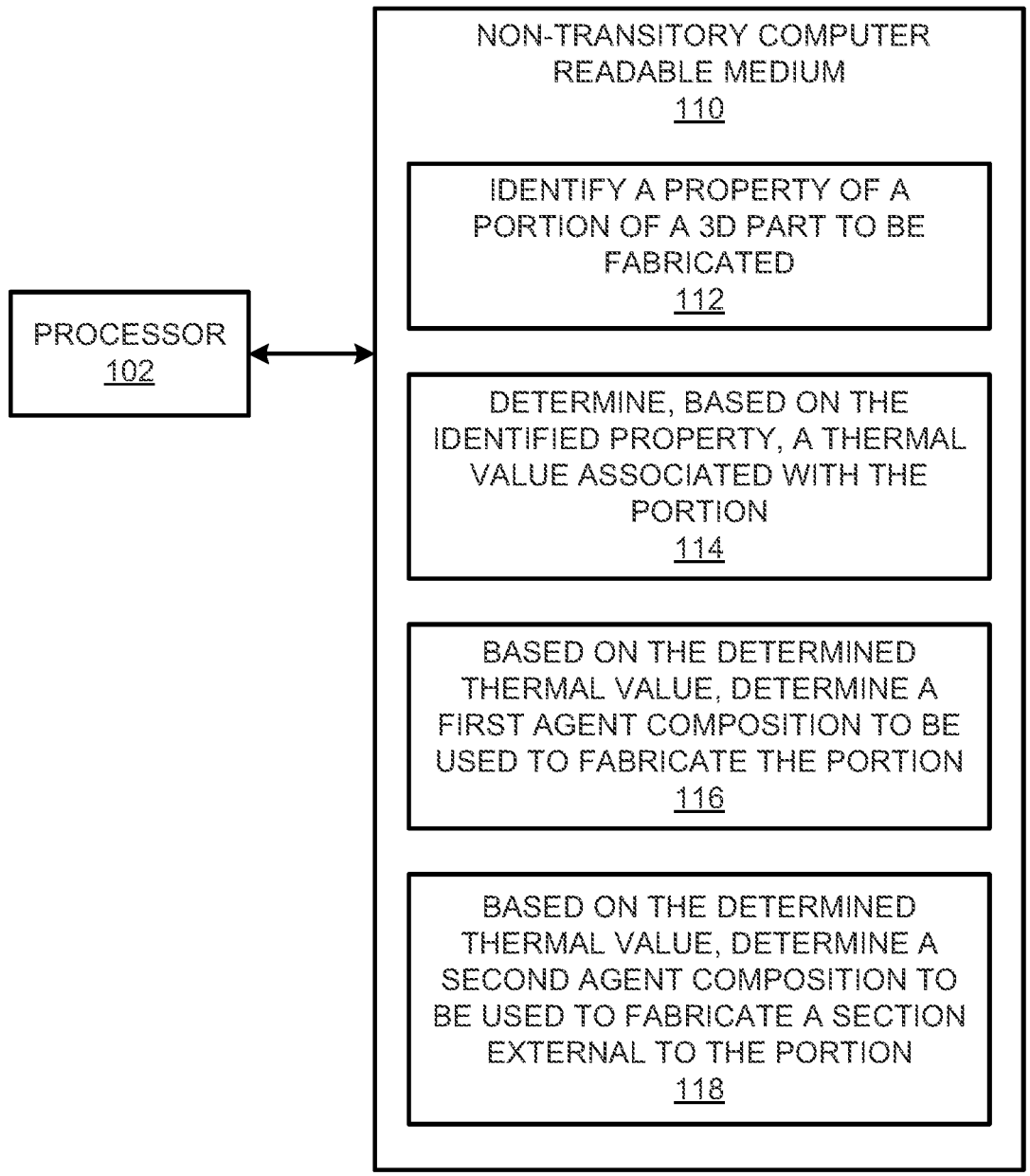
FIG. 1 shows a block diagram of an example apparatus that may determine agent compositions to be used in the fabrication of a 3D part.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

In some types of 3D fabrication systems, colorants, fusing agents, or other types of modifying agents may be applied onto build material particle layers at selected areas of the layers that are to be joined together to form sections of a 3D part. In these types of 3D fabrication systems, the build material particles (which may also be termed "particles" herein) in the selected areas may coalesce, e.g., fuse, bind, etc., together following application of energy, e.g., in the form of radiation, onto the layers. That is, the coalescing agent may increase absorption of the energy by the particles on which the coalescing agent has been applied, in which the temperature of those particles is intended to rise above a melting point temperature of the particles and thus melt. As the particles subsequently cool, the particles that melted may join together as the particles solidify. In some instances, thermal bleed may occur from the heated particles to the particles external and adjacent to the boundary of the solidified portion, which may raise the temperature of the particles in the section external to the boundary above their melting point and may cause sintering, fusing, and/or coalescence of those particles with particles in the boundary section. When this occurs, the particles in the external section may join with the particles in the boundary section, which may reduce surface properties, e.g., overall dimensional accuracy, roughness, undefined borders, unintended optical characteristics, and/or the like, of the 3D part.

To enhance the surface properties of the solidified portion, the same modifying agent, e.g., colorant or other type of agent that may affect a property, such as a physical and/or optical property, of the particles, applied to the particles in the boundary portion may also be applied to the particles in the external section even though the particles in the external section are not intended to be fused to the 3D part. However, the fusing agent may not be applied to those particles in the external section. Instead, a detailing agent (which may also be referenced herein as anti-coalescing or anti-fusing agent) may be applied to those particles to inhibit or prevent those particles from fusing to each other or to the particles in the boundary portion. The volume of detailing agent applied may, however, affect solidification of the particles in the boundary portion. That is, for instance, an insufficient volume of detailing agent may cause the particles to reach their melting point while application of too much detailing agent may significantly cool the particles in the boundary portion, which may prevent those particles from melting properly and thus from fusing together properly.

In addition to the fusing agent, another modifying agent applied onto the particles may affect the ability of the build material particles to reach their melting point temperature. For instance, modifying agents having different colors or other properties, such as water content, may absorb different amounts of energy, e.g., fusing energy. For instance, colors such as cyan and black may absorb significant amounts of energy in certain wavelengths, while colors such as yellow and magenta may not absorb significant amounts of energy in the certain wavelengths. Combinations of these various colors may thus result in different absorptivities.

Thus, for instance, a greater volume of fusing agent may be applied to particles that are intended to coalesce when the modifying agent does not absorb significant amounts of energy and a lesser volume of fusing agent may be applied to particles that are intended to coalesce when the modifying agent absorbs significant amounts of energy. As such, for instance, the volume of fusing agent to be applied may vary based on features of the modifying agent, such as the color of the modifying agent, the water content of the modifying agent, the composition of the modifying agent, and/or the like, to be applied. Similarly, the volume of detailing agent to be applied may vary based on the features of the modifying agent to be applied to the section adjacent to the boundary portion.

In many instances, the correlations between the volume of fusing agent is static in that for a given color, a particular volume of fusing agent or detailing agent may be defined, regardless of the volume of the colorant to be applied. In addition, the correlations may be maintained in a color map, which may be used in a printing pipeline to determine the volumes of the fusing agent and the detailing agent that are to be applied to fabricate a 3D part. A model of the 3D part may initially be defined in the RGB color space and the printing pipeline may use the color map to convert the RGB colors into the CMYK color space, which a 3D fabrication system may use to fabricate the 3D part.

The use of static correlations in the printing pipeline, however, may result in a reduction in surface properties. That is, for instance, when a boundary portion is relatively small, e.g., less than about 3 mm in width, the application of a certain amount of detailing agent to the external section may cause significant cooling to the boundary portion, which may prevent the boundary portion from coalescing properly following application of energy onto the boundary portion. Alternatively, when a boundary portion is relatively large, e.g., greater than about 10 mm in width, the application of a certain amount of fusing agent in the boundary portion and the application of a certain amount of detailing agent in the adjacent section may cause sufficient thermal bleed to occur into the external section during application of the energy.

Disclosed herein are apparatuses, methods, and computer readable media that may dynamically calculate agent compositions for the boundary portion and the external section (which is also referenced herein as an adjacent section) based on thermal values associated with the boundary portion and the external section. As discussed herein, a processor may identify a property, e.g., an intended property, of a portion, e.g., a boundary portion, a border portion, or the like, of a 3D part to be fabricated. The processor may identify the intended property from a 3D model as may be identified in a data file. In addition, the processor may determine a thermal value associated with the portion based on the identified intended property.

The thermal value associated with the portion may be based on a determined thermal response predicted to occur by particles and modifying agent or a combination of modifying agents to receipt of energy, e.g., fusing energy. The thermal response may correspond to an energy absorptivity effect of a modifying agent having a particular feature, such as color, composition, water content, and/or the like. By way of example, a black or cyan agent may have a higher energy absorptivity effect than a yellow or magenta agent. In addition, or alternatively, the thermal response may correspond to a cooling effect of a modifying agent having a particular feature. By way of example, a yellow or magenta agent may have a higher cooling effect than a black or cyan colorant. The thermal response of a modifying agent may also depend on the geometry, e.g., the size, of the portion, as the volume of modifying agent applied may correspond to the geometry of the portion and may thus affect the energy absorptivity and/or cooling effects. In addition, as modifying agents may include water or other liquid, increasing the volume of the modifying agents may increase the cooling effects of the modifying agents.

According to examples, the thermal responses of various modifying agents, various combinations of modifying agents, various geometries, and/or the like, to applied energy may be determined through testing, modeling, historical data, and/or the like, and may vary for different types of modifying agents, different types of build material particles, different types of fusing energy sources, etc. The correlations between the thermal responses and the various modifying agents, combinations of modifying agents, and/or combinations of modifying agents and geometries may be stored in a lookup table. In addition, the thermal responses of various modifying agents, combinations of modifying agents, and/or combinations of modifying agents and geometries for which empirical data may not be available, e.g., for which correlations are not listed in the lookup table, linear or other mathematical interpolation may be performed to predict or equivalently, calculate, those thermal responses. In any regard, the thermal value may be a value or multiple values that may be assigned depending on the thermal response. For instance, a first thermal response may be assigned a first thermal value, a second thermal response may be assigned a second thermal value, and so forth.

Additionally, based on the determined thermal value, the processor may determine a first agent composition to be used to fabricate the portion. The processor may also determine a second agent composition to be used for the external section. Particularly, for instance, the processor may determine the first agent composition and the second agent composition to each include selected volumes of a first type of agent (e.g., a first modifying agent), a combination of types of agents (e.g., a first type of agent and a second type of agent), a fusing agent, a detailing agent, and/or any combination thereof, to cause the portion and the external section to be fabricated to have the color corresponding to the color identified in the 3D model while maintaining the external section separate from the portion following application of energy onto build material particles upon which agents have been applied according to the first agent composition and the second agent composition. As such, the first agent composition may differ from the second agent composition. As used herein, the external section may be deemed to be separate from the portion when a certain percentage of the build material particles in the external section is not fused, coalesced, joined, bound, etc., to the build material particles in the external section. The certain percentage may be, for instance, above around 90%, although the certain percentage may be other percentages. In one regard, therefore, the external section may be deemed to be separate from the portion even though there may be some relatively small amount of sintering between the build material particles in the external section and the portion.

According to examples, a lookup table may include, for each of a number of thermal values, agent compositions to be used to fabricate portions of a 3D part and agent compositions to be used to fabricate external sections of a 3D part. The mappings between the thermal values and the agent compositions may be determined through testing, modeling, historical data, and/or the like, and may vary for different types of colorants, different types of build material particles, different types of fusing energy sources, etc. In addition, for mappings between the thermal values and agent compositions that are not listed in the lookup table, linear or other mathematical interpolation may be performed to determine the agent compositions for the thermal responses.

The operations discussed herein may be performed as part of a printing pipeline for a 3D model. Thus, for instance, an output of the operations may be the agent compositions that are to be used to fabricate each layer of a 3D part corresponding to the 3D model. In addition, a 3D fabrication system may use the determined agent compositions to fabricate the 3D part, layer by layer.

As discussed herein, the use of the same agent composition, e.g., the same volume of fusing agent, the same volume of detailing agent, or the like, for a modifying agent regardless of the volumes of the agents being applied and regardless of the geometries of the portions of the 3D part being fabricated, may result in a reduction in properties of the surface of the 3D part, e.g., may result in surface imperfections. This may still occur even though detailing agent is applied to build material particles located in a section that is external and adjacent to the surface. Through implementation of the features of the present disclosure, agent compositions (or equivalently, formulations) for the portions of the 3D part and the external sections may be determined dynamically based on, for instance, predicted thermal responses at the portions and the external sections. The agent formulations may be determined such that the thermal effects, e.g., thermal bleed, cooling, etc., resulting from use of the agent formulations during a fabrication process may result in the boundaries of the 3D part to have accurate visual and/or physical features, e.g., as intended in the 3D model.

Figure 2A:
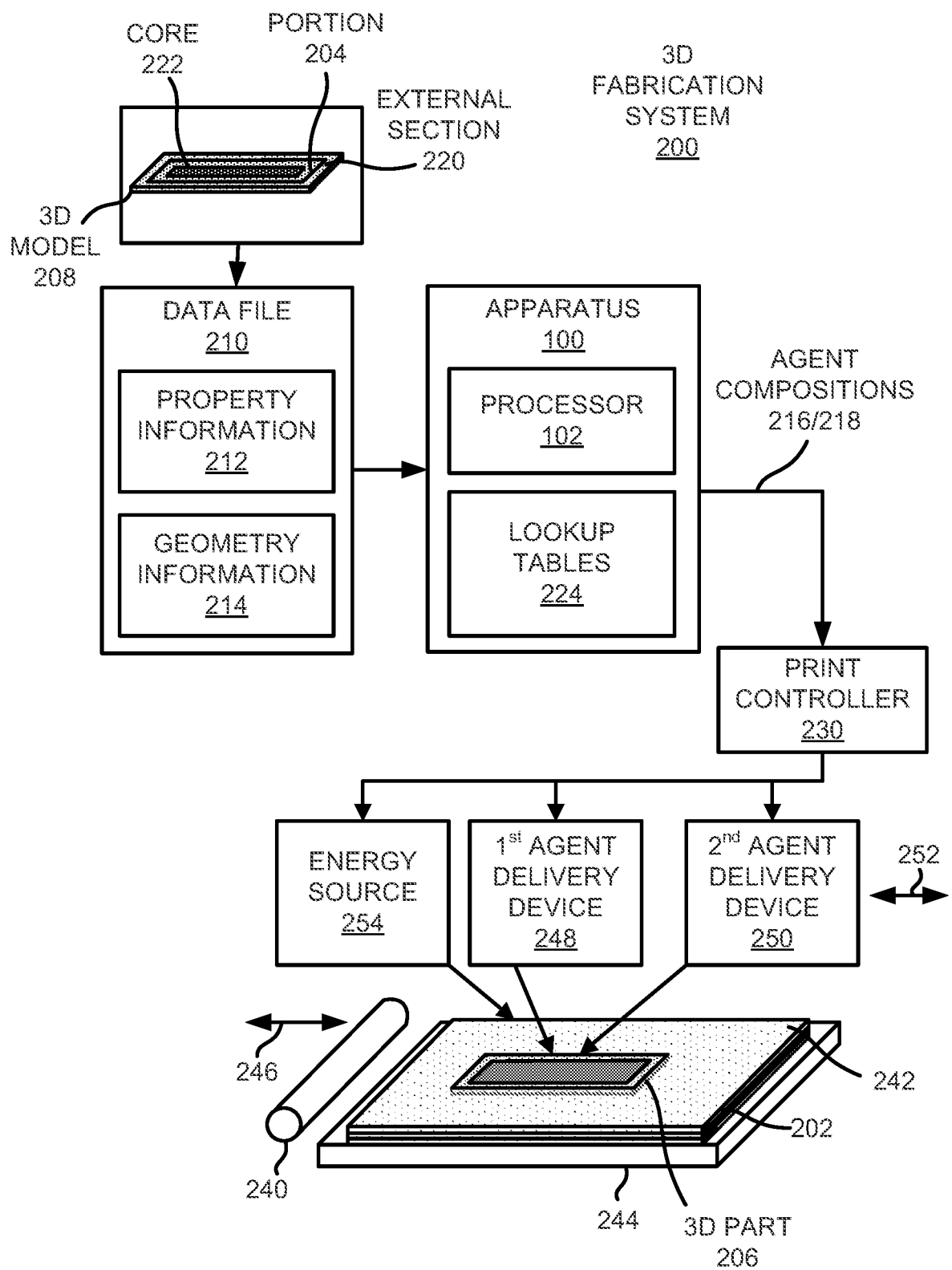
FIG. 2A shows a diagram of an example 3D fabrication system in which the apparatus depicted in FIG. 1 may be implemented.
Figure 2B:
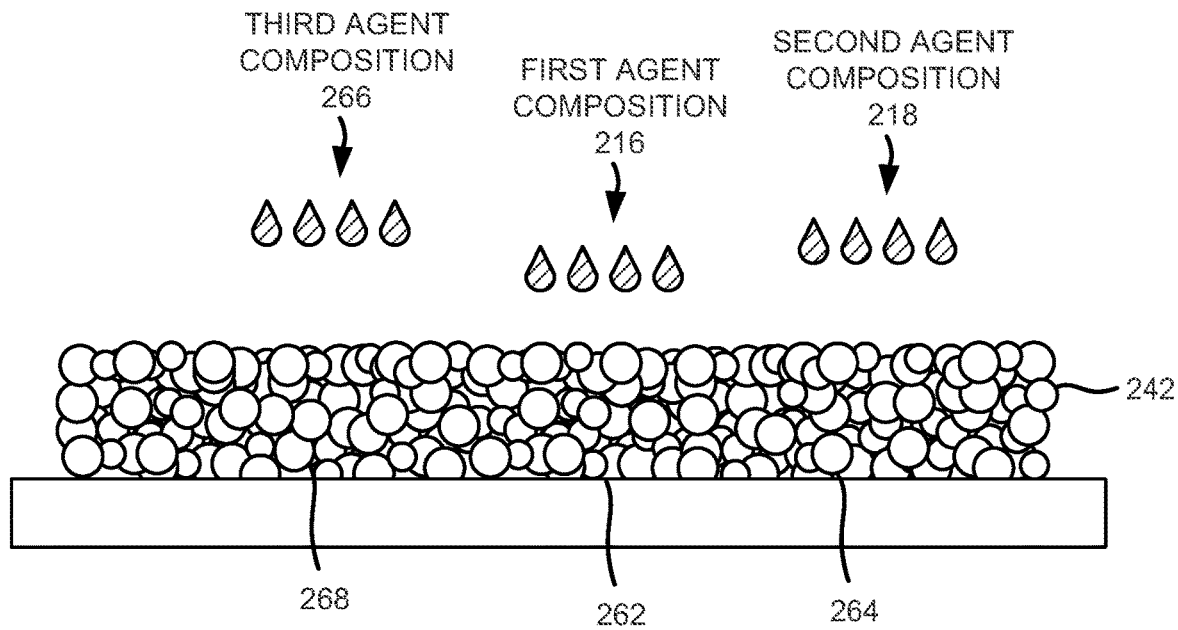
FIGS. 2B and 2C, respectively, depict an example portion and an example external section of a 3D part during two stages of fabrication using the agent compositions determined by the apparatus depicted in FIG. 1.
Figure 2C:
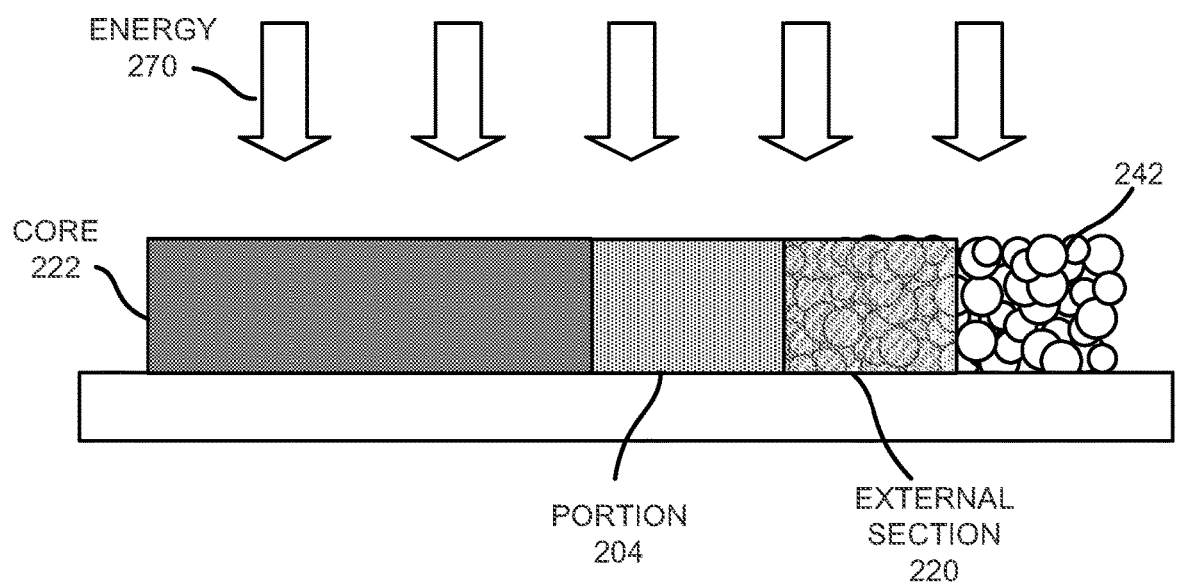

Reference is made first to FIGS. 1 and 2A-2C. FIG. 1 shows a block diagram of an example apparatus 100 that may determine agent compositions to be used in the fabrication of a 3D part. The apparatus 100 may determine the agent compositions such that a portion of a 3D part is fabricated to be separate from an external section to the portion, while causing the external section to have the same or similar color as the portion to, for instance, enhance a surface property of the 3D part. FIG. 2A shows a diagram of an example 3D fabrication system 200 in which the apparatus 100 depicted in FIG. 1 may be implemented. FIGS. 2B and 2C, respectively, depict an example portion 204 and an example external section 220 of a 3D part 206 during two stages of fabrication using the agent compositions determined by the apparatus 100 depicted in FIG. 1. It should be understood that the example apparatus 100 depicted in FIG. 1, the example 3D fabrication system 200 depicted in FIG. 2A, and the example portion and example external section depicted in FIGS. 2B and 2C may include additional features and that some of the features described herein may be removed and/or modified without departing from the scopes of the apparatus 100 or the 3D fabrication system 200.

The apparatus 100 may be a computing device, a tablet computer, a server computer, a smartphone, or the like. The apparatus 100 may alternatively be part of the 3D fabrication system 200, e.g., a CPU of the 3D fabrication system 200. Although the apparatus 100 is depicted as including a single processor 102, it should be understood that the apparatus 100 may include multiple processors, multiple cores, or the like, without departing from a scope of the apparatus 100. In any regard, the apparatus 100 may execute or implement a printing pipeline to determine various compositions of various agents to be used to fabricate a 3D part.

The 3D fabrication system 200, which may also be termed a 3D printing system, a 3D fabricator, or the like, may be implemented to fabricate or equivalently, print, 3D parts through selective solidification of build material particles 202, which may also be termed particles 202 of build material. In some examples, the 3D fabrication system 200 may use agents to selectively bind and/or solidify the particles 202. In particular examples, the 3D fabrication system 200 may use fusing agents that may increase the absorption of fusing energy to selectively fuse the particles 202 on which the fusing agents are deposited. In addition, the 3D fabrication system 200 may use modifying agents, such as colorant agents, to apply color to portions of the 3D printed parts. The modifying agents may be differently colored inks, such as inks having one of cyan, magenta, yellow, or black colors, although the 3D fabrication system 200 may use additional and/or other colored inks or fluids. The modifying agents may additionally or alternatively have other compositions that may affect other properties of the portion 204 of the 3D part 208 such as, conductivity, surface roughness, elasticity, translucency, and/or the like.

In some examples, fusing agents and modifying agents may be combined into combined agents, while in other examples, the fusing agents may be separate from the modifying agents. In any of these examples, some of the fusing agents may be mainly transparent, e.g., have a low tint, while other fusing agents may have a dark, e.g., black color.

According to one example, a suitable agent may be an ink-type formulation including carbon black, such as, for example, the agent formulation commercially known as V1Q60A "HP fusing agent" available from HP Inc. The carbon black agent may be used to fuse particles that form interiors, e.g., hidden core portions, of 3D parts, while agents having lighter colors and/or greater translucency may be used to fuse particles that form exteriors of the 3D parts. In one example, such an agent may additionally include an infra-red light absorber. In one example such agent may additionally include a near infra-red light absorber. In one example, such an agent may additionally include a visible light absorber. In one example, such an agent may additionally include a UV light absorber. Examples of agents including visible light enhancers are dye based colored ink and pigment based colored ink, such as inks commercially known as CE039A and CE042A available from HP Inc.

According to examples, the 3D fabrication system 200 may use a fusing agent that may be separate from the modifying agents. In these examples, the 3D fabrication system 200 may separately control the volumes at which the fusing agent and the modifying agents may be applied onto the build material particles 202. According to examples, the 3D fabrication system 200 may additionally use a detailing agent that may reduce or impede coalescence, e.g., fusing, of build material particles 202 onto which the agent has been deposited and/or absorbed. In one example, the detailing agent may be a substantially transparent liquid. According to one example, a suitable type of such an agent may be a formulation commercially known as V1Q61A "HP detailing agent" available from HP Inc. The 3D fabrication system 200 may also separately control the volumes at which the detailing agent is applied.

The build material particles 202 may include any suitable material for use in forming 3D parts. The build material particles 202 may include, for instance, a polymer, a plastic, a ceramic, a nylon, a metal, combinations thereof, or the like, and may be in the form of a powder or a powder-like material. Additionally, the build material particles 202 may be formed to have dimensions, e.g., widths, diameters, or the like, that are generally between about 5 µm and about 100 µm. In other examples, the particles 202 may have dimensions that are generally between about 30 µm and about 60 µm. The particles 202 may have any of multiple shapes, for instance, as a result of larger particles being ground into smaller particles. In some examples, the particles 202 may be formed from, or may include, short fibers that may, for example, have been cut into short lengths from long strands or threads of material. In addition or in other examples, the particles 202 may be partially transparent or opaque. According to one example, a suitable build material may be PA12 build material commercially known as V1R10A "HP PA12" available from HP Inc.

As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. The apparatus 100 may also include a non-transitory computer readable medium 110 that may have stored thereon machine readable instructions 112-118 (which may also be termed computer readable instructions) that the processor 102 may execute. The non-transitory computer readable medium 110 may be an electronic, magnetic, optical, or other physical storage device that contains or stores executable instructions, where the term "non-transitory" does not encompass transitory propagating signals. The non-transitory computer readable medium 110 may be, for example, Random Access memory (RAM), an Electrically Erasable Programmable Read-Only Memory (EEPROM), a storage device, an optical disc, and the like. The non-transitory computer readable medium 110 may also be referred to as a memory.

In some examples, instead of the non-transitory computer readable medium 110, the apparatus 100 may include hardware logic blocks that may perform functions similar to the instructions 112-118. In yet other examples, the apparatus 100 may include a combination of instructions and hardware logic blocks to implement or execute functions corresponding to the instructions 112-118. In any of these examples, the processor 102 may implement the hardware logic blocks and/or execute the instructions 112-118. As discussed herein, the apparatus 100 may also include additional instructions and/or hardware logic blocks such that the processor 102 may execute operations in addition to or in place of those discussed above with respect to FIG. 1.

The processor 102 may fetch, decode, and execute the instructions 112 to identify a property of a portion 204 of a 3D part 206 to be fabricated as shown in FIG. 2A. The property of the portion 204 may be an intended property for the portion 204, such as an intended color, an intended conductivity, an intended elasticity, and/or the like. The processor 102 may identify the property of the portion 204 from a 3D model 208 of the 3D part 206. The 3D model 208 may be a data representation of the 3D part 206 to be fabricated. Particularly, for instance, a data file 210 may contain information about the 3D model 208 that the processor 102 may access to identify the property of the portion 204 of the 3D part 206. As discussed herein, the portion 204 may be a boundary portion of the 3D model 208, which may be equivalent or correspond to a boundary portion of the 3D part 206. In this regard, the portion 204 may represent any portion of the 3D part 206 having an external surface of the 3D part 206.

The data file 210 may contain information pertaining to features of the 3D model 208, such as property information 212 of the external surfaces of the 3D model 208, geometry information 214 (for instance, physical dimensions of the external surfaces, orientations of the surfaces, etc.). The property information 212 may define the colors of the external surfaces of the 3D model 208, for instance, in the RGB color space. In some examples, the processor 102 may convert the color of the portion 204 defined in the property information 212 to the CMYK color space to identify the color of the portion 204. The property information 212 may also or alternatively define a property such as translucency, conductivity, surface roughness, elasticity, and/or the like, of the external surfaces of the 3D model 208. In any regard, it should be understood that the 3D model 208 depicted in FIG. 2A is merely an example and should thus not be construed as limiting the present disclosure in any respect.

Although particular reference is made to the processor 102 identifying the property of the portion 204, the processor 102 may identify the properties of each of the portions forming the 3D model 208 or the 3D part 206. In this regard, the description of processes implemented with regard to the portion 204 may be applicable to the other unlabeled portions of the 3D model 208 or the 3D part 206, e.g., to each of the portions having an external surface of the 3D model 208 or the 3D part 206.

The processor 102 may fetch, decode, and execute the instructions 114 to, determine, based on the identified property of the portion 204, a thermal value associated with the portion 204. The thermal value associated with the portion 204 may be based on a thermal response predicted to occur by build material particles 202 and a modifying agent or a combination of modifying agents in the portion 204 to receipt of energy, e.g., fusing energy. The thermal response may correspond to an energy absorptivity effect of a modifying agent having a particular composition, e.g., a particular color, a particular water content, and/or the like. In addition, or alternatively, the thermal response may correspond to a cooling effect of a modifying agent. As discussed herein, the thermal response of a modifying agent may also depend on the geometry, e.g., the size, of the portion, as the volume of modifying agent applied may correspond to the geometry of the portion and may thus affect the energy absorptivity and/or cooling effects. As such, for instance, the processor 102 may, in some examples, determine the thermal value associated with the portion 204 based on both the geometry and the identified modifying agent of the portion 204. In addition, as modifying agents may include water or other liquid, increasing the volume of the modifying agents may increase the cooling effects of the modifying agents.

As discussed herein, the thermal responses of various modifying agents, various combinations of modifying agents, various geometries, and/or the like, to applied energy may be determined through testing, modeling, historical data, and/or the like. In addition, the correlations between the thermal responses and the various modifying agents, combinations of modifying agents, and/or combinations of modifying agents and geometries may be stored in a lookup table 224 and correlations that are not listed in the lookup table 224 may be interpolated or otherwise determined from the correlations listed in the lookup table 224. In any regard, the processor 102 may determine the thermal value associated with the portion 204 corresponding to the identified color.

The processor 102 may fetch, decode, and execute the instructions 116 to, based on the determined thermal value, determine a first agent composition 216 to be used to fabricate the portion 204. The processor 102 may fetch, decode, and execute the instructions 118 to, based on the determined thermal value, determine a second agent composition 218 to be used to fabricate an external section 220, which is adjacent to and separate from the portion 204. The external section 220 may include a section of build material particles 202 that are in contact with or in close proximity, e.g., within about 0.1 mm to about 5 mm, of the external surface of the portion 204. In any regard, the external section 220 may be an area on a layer of build material particles 202 that is to have the same color as the portion 204. The external section 220 may also affect the thermal response of the portion 204 during and/or after application of energy onto the portion 204, e.g., may affect the amount of thermal bleed from the portion 204, the amount of cooling applied to the portion 204 from the external section 220, and/or the like. The external section 220 may be formed in the same layer 232 as the portion 204 and/or may be formed in a lower or a higher layer 232 than the layer 232 in which the portion 204 may be formed.

The processor 102 may determine the first agent composition 216 and the second agent composition 218 to each include selected volumes of a modifying agent, a combination of modifying agents, a fusing agent, a detailing agent, and/or any combination thereof, to cause the portion and the external section to be fabricated to have the property corresponding to the property identified in the 3D model 208 while maintaining the external section 220 separate from the portion 204 following application of energy onto build material particles 202 upon which agents have been applied according to the first agent composition 216 and the second agent composition 218. To enable the separation between the external section 220 and the portion 204, the first agent composition 216 may differ from the second agent composition 218.

According to examples, the processor 102 may determine the first agent composition 216 and the second agent composition 218 to each include: a first modifying agent, a second modifying agent, a first volume of a fusing agent, a second volume of the fusing agent, a first volume of a detailing agent, a second volume of the detailing agent, or any combination thereof, to cause the portion 204 and the external section 220 to be fabricated to have the identified property while maintaining separation between the external section 220 and the portion 204. According to examples, the processor 102 may determine the first agent composition 216 and the second agent composition 218 to cause build material particles 202 in the external section 220 to have the identified property without fusing, coalescing, or binding with build material particles 202 in the portion 204 during or after application of energy and without cooling the build material particles 202 in the external section 220 to a level that inhibits or prevents the build material particles 202 within the portion 204 to fuse, coalesce, or bind with each other.

According to examples, the processor 102 may compare the determined thermal value associated with the portion 204 with a first predefined threshold to determine the first agent composition 216. For instance, based on a determination that the determined thermal value exceeds the first predefined threshold, the processor 102 may determine that the first agent composition 216 is to include little to no fusing agent. The first predefined threshold may include, for instance, a temperature at which the build material particles 202 are to melt and thus, the processor 102 may determine that little to no fusing agent may be included in the first agent composition 216 as the modifying agent in the first agent composition 216 may absorb sufficient amounts of energy to cause the build material particles 202 upon which the modifying agent has been applied to sufficiently melt.

According to examples, the processor 102 may compare the determined thermal value associated with the portion 204 with a second predefined threshold to determine the first agent composition 216. For instance, based on a determination that the determined thermal value falls below the second predefined threshold, the processor 102 may determine that the second agent composition 218 is to include little to no detailing agent. The second predefined threshold may include, for instance, a temperature that may be based on the amount of cooling or heating that the modifying agent or agents to be applied to the external section 220 is calculated to provide to the portion 204 and may be selected such the amount of cooling does not significantly inhibit or prevent melting of the build material particles 202 in the portion 204.

As also shown in FIG. 2A, the 3D model 208, and equivalently the 3D part 206, may include a core 222 that may be formed within the portion 204 such that the core 222 does not include any external surfaces of the 3D part 206. The processor 102 may also determine a third agent composition for the core 222 as the core 222 may have different physical and/or optical characteristics as compared to the portion 204. For instance, the processor 102 may determine the third agent composition to include a certain volume of fusing agent to be applied and that no modifying agents are to be applied.

The agent compositions 216/218 may define the volumes, e.g., amounts, drop numbers, locations of drops, etc., at which an agent is or multiple agents are to be applied onto respective layers of build material particles 202 to fabricate the portion 204 and the external section 220 of the 3D part 206. For instance, the first agent composition 216 may define the respective volumes of a fusing agent, a modifying agent, and/or a detailing agent are to be applied to fabricate the portion 204. The second agent composition 218 may define the respective volumes of a fusing agent, a modifying agent, and/or a detailing agent are to be applied to fabricate the portion 204.

As discussed herein, the processor 102 may determine or select the first agent composition 216 such that the portion 204 of the 3D part 206 may be fabricated to have a property that accurately matches the property of the portion 204 of the 3D model 208. This may include determining the first agent composition 216 to include the deposition of multiple modifying agents having respective different compositions. In addition, the processor 102 may determine or select the second agent composition 218 such that the external section 220 may be fabricated to have a property that also accurately matches the property of the portion 204. In some examples, the first agent composition 216 and the second agent composition 218 may include the same compositions, e.g., types and volumes, of modifying agents, but may have differing compositions of fusing agent and/or detailing agent, including no volumes of the fusing and/or detailing agents.

In some examples, the first agent composition 216 may include a volume of detailing agent, such as, for example, in an instance in which the volume and type of a modifying agent to be used may cause the build material particles 202 in the portion 204 to reach a temperature that exceeds a predefined temperature that may cause over-melting or other possible defect. In some examples, the second agent composition 218 may include a volume of fusing agent, such as, for example, in an instance in which the volume and type of modifying agent to be used may cause the build material particles 202 in the external section 220 to fall below a predefined temperature that may cause over-cooling or other possible defect in the portion 204.

As shown in FIG. 2A, the 3D fabrication system 200 may include a print controller 230 that may control operations of components of the 3D fabrication system 200 to fabricate the 3D part 206. That is, the processor 102 may communicate the determined agent compositions 216/218 to the print controller 230, e.g., as part of a printing pipeline, and the print controller 230 may control operations of the components based on the received agent compositions 216/218 to fabricate the 3D part 206 to have the portion 204 and the external section 220 as discussed herein. The processor 102 may also communicate agent compositions for the other portions of the 3D part 206 and external sections to the print controller 230 such that the print controller 230 may control the components to fabricate the 3D part 206.

The 3D fabrication system 200 may include a spreader 240 that the print controller 230 may control to spread the build material particles 202 into a layer 242, e.g., through movement across a platform 244 as indicated by the arrow 246. As also shown in FIG. 2A, the 3D fabrication system 200 may include a first agent delivery device 248 and a second agent delivery device 250, although the 3D fabrication system 200 may include any number of additional agent delivery devices. The first agent delivery device 248 and the second agent delivery device 250 may be scanned in the direction denoted by the arrow 252, in a direction perpendicular to the arrow 252, and/or in other directions. In addition, or alternatively, the platform 244 on which the layers 242 are deposited may be scanned in directions with respect to the first agent delivery device 248 and the second agent delivery device 250. The 3D fabrication system 200 may include an energy source 254 that may output energy onto the layer 242 as the energy source 254 is scanned across the layer 242 as denoted by the arrow 252. The energy source may be a laser beam source, a heating lamp, or the like, that may apply energy onto the layer 242, in which the energy may be radiation, for instance.

The 3D fabrication system 200 may fabricate the 3D part 206 through selective deposition of a agents on respective layers 242 of the build material particles 202. Particularly, the print controller 230 may control the agent delivery devices 248, 250 to selectively deposit modifying agents, fusing agent, detailing agent, and combinations thereof according to the agent compositions 216, 218. This process is depicted in greater detail in FIGS. 2B and 2C. Particularly, FIG. 2B depicts that the print controller 230 may control the agent delivery devices 248, 250 to deposit agents according to the first agent composition 216 at a first location 262 of a layer 242 corresponding to the portion 204. In addition, the print controller 230 may control the agent delivery devices 248, 250 to deposit agents according to the second agent composition 218 at a second location 264 of the layer 242 corresponding to the external section 220. Moreover, the print controller 230 may control the agent delivery devices 248, 250 to deposit agents according to a third agent composition 266 at a third location 268 of the layer 242 corresponding to the core 222.

As shown in FIG. 2C, energy 270 may be applied onto the layer 242 following application of the agents as shown in FIG. 2B. The portion 204, the external section 220, and the core 222 may be formed during and/or following application of the energy 270 onto the build material particles 202 on which agents have been applied according to the respective agent compositions.

Various manners in which the processor 102 may operate are discussed in greater detail with respect to the method 300 depicted in FIG. 3. Particularly, FIG. 3 depicts a flow diagram of an example method 300 for selecting compositions of agents to be applied to fabricate a 3D part 206 based on thermal values. It should be understood that the method 300 depicted in FIG. 3 may include additional operations and that some of the operations described therein may be removed and/or modified without departing from the scope of the method 300. The description of the method 300 is made with reference to the features depicted in FIGS. 1-2C for purposes of illustration.

At block 302, the processor 102 may identify a property and a geometry of a portion 204 of a 3D part 206 to be fabricated. As discussed herein, the processor 102 may identify the property and the geometry of the portion 204 from a data file 210 corresponding to a 3D model 208 of the 3D part 206. This may include identifying the color through a conversion of the color from the RGB color space to the CMYK color space.

At block 304, the processor 102 may determine a thermal value associated with the portion 204 based on the identified property and geometry. In some examples, a modifying agent is or a combination of modifying agents are to be applied onto build material particles 202 in the portion 204 and the external section 220 to cause the portion 204 and the external section 220 to have the identified property. In addition, energy 270 may be applied to the build material particles 202 in the portion 204 and the external section 220 during fabrication of the 3D part 206. The processor 102 may calculate a thermal response of the build material particles 202 and the modifying agent or combination of modifying agents in the portion 204 to receipt of the energy 270 and may determine the thermal value based on the calculated thermal response. In addition, the processor 102 may determine absorptivities and cooling effects of the modifying agent or combination of modifying agents to be applied onto the build material particles 202 responsive to receipt of the energy 270 and may calculate the thermal response based on the determined absorptivities and cooling effects.

At block 306, the processor 102 may select a first composition 216 of agents to be applied onto build material particles 202 to fabricate the portion 204 to have the identified property and geometry. The processor 102 may select the first composition 216 of agents in any of the manners discussed above.

At block 308, the processor 102 may select a second composition 218 of agents to be applied onto build material particles 202 in an external section 220 that is adjacent to the portion 204. According to examples, the processor 102 may select the second composition 218 of agents to prevent the build material particles 202 in the external section 220 from joining build material particles 202 in the external section 220 or the portion 204 while having the identified property.

According to examples, the processor 102 may select the first composition 216 of agents and the second composition 218 of agents to cause build material particles 202 in the external section 220 to have the identified property without fusing, coalescing, or binding with build material particles 202 in the portion 204 during or after application of the energy 270 and without cooling the build material particles 202 in the external section 220 to a level that inhibits or prevents the build material particles 202 within the portion 204 to fuse, coalesce, or bind with each other.

According to examples, the method 300 may also include, communicating, by the processor 102, the selected first composition 216 of agents and the selected second composition 218 of agents to the print controller 230. The method 300 may further include, fabricating, by the 3D fabrication system 200, the 3D part 206 according to the selected first composition 216 of agents and the selected second composition 218 of agents.

Some or all of the operations set forth in the method 300 may be contained as utilities, programs, or subprograms, in any desired computer accessible medium. In addition, the method 300 may be embodied by computer programs, which may exist in a variety of forms. For example, the method 300 may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Turning now to FIG. 4, there is shown a block diagram of an example computer readable medium 400 that may have stored thereon machine readable instructions that when executed by a processor, may cause the processor to select compositions of agents for a portion 204 and an external section 220 of a 3D part 206 based on a determined thermal value associated with the portion 204. It should be understood that the computer readable medium 400 depicted in FIG. 4 may include additional instructions and that some of the instructions described herein may be removed and/or modified without departing from the scope of the computer readable medium 400 disclosed herein. The computer readable medium 400 may be a non-transitory computer readable medium. The term "non-transitory" does not encompass transitory propagating signals.

The computer readable medium 400 may have stored thereon machine readable instructions 402-408 that a processor, such as the processor 102 depicted in FIGS. 1 and 2A, may execute. The computer readable medium 400 may be an electronic, magnetic, optical, or other physical storage device that contains or stores executable instructions. The computer readable medium 400 may be, for example, Random Access memory (RAM), an Electrically Erasable Programmable Read-Only Memory (EEPROM), a storage device, an optical disc, and the like.

The processor may fetch, decode, and execute the instructions 402 to identify, in a 3D model 208, an intended property and an intended geometry of a portion 204 of a 3D part 206 to be fabricated corresponding to the 3D model 208. The processor may fetch, decode, and execute the instructions 404 to determine a thermal value associated with the portion 204 based on the identified intended property and intended geometry. The thermal value may correspond to a calculated thermal response of build material particles 202 and a modifying agent or modifying agents applied on the build material particles to energy applied onto the build material particles 202 and the modifying agent or modifying agents.

The processor may fetch, decode, and execute the instructions 406 to select a first composition 216 of agents to be applied onto build material particles 202 to fabricate the portion 204 to have the identified intended property and intended geometry. The processor may fetch, decode, and execute the instructions 408 to select a second composition 218 of agents to be applied onto build material particles 202 in an external section 220 that is adjacent to the portion 204. The second composition 218 of agents may be selected to prevent the build material particles 202 in the external section 220 from joining build material particles 202 in the portion 204 while having the identified property.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:
1. An apparatus comprising:
a processor; and
a non-transitory computer readable medium on which is stored instructions that when executed by the processor, are to cause the processor to:
  identify a color and a geometry of a boundary portion of a three-dimensional (3D) object to be fabricated via an additive manufacturing process in which build material particles are deposited on a layer-by-layer basis and selectively fused;
  determine, based on the color and the geometry of the boundary portion—a temperature associated with the boundary portion and corresponding to a thermal response of the build material particles and one or more colorants, a fusing agent, and/or a detailing agent applied thereon to applied energy;
  based on the temperature determined based on the color and the geometry of the boundary portion,
    determine a first agent composition of the one or more colorants, the fusing agent, and/or the detailing agent to be used to fabricate the boundary portion, and
    a second agent composition of the one or more colorants, the one or more fusing agents, and the one or more detailing agents to be used to fabricate an external section adjacent to the boundary portion and that the is not part of the 3D object; and
  cause the 3D object to be fabricated via the additive manufacturing process using the determined first agent composition for the boundary portion and the determined second agent composition for the external section,
wherein the first agent composition and the second agent composition are determined such that the boundary portion and the external section are fabricated to have the color of the boundary portion while maintaining the external section separate from the boundary portion such that the external section is not fused with the boundary portion.

2. The apparatus of claim 1, wherein the one or more colorants comprise a colorant of a first type and a colorant of a second type,
wherein the first agent composition comprises a first volume of the fusing agent and a first volume of the detailing agent,
and wherein the second agent composition comprises a second volume of the fusing agent and a second volume of the detailing agent.

3. The apparatus of claim 1, wherein the first agent composition and the second agent composition are determined such that the build material particles in the external section have the color, do not fuse, coalesce, or bind with the build material particles in the boundary portion during or after application of energy, and do not cool to a level that inhibits or prevents the build material particles in the boundary portion to fuse, coalesce, or bind with each other.

4. The apparatus of claim 1, wherein the instructions are to cause the processor to:
determine the thermal response predicted to occur by the build material particles and the one or more colorants, the fusing agent, and/or the detailing agent in the boundary portion in response to receipt of the applied energy; and
determine the temperature based on the determined thermal response.

5. The apparatus of claim 4, wherein the instructions are further to cause the processor to:
   determine absorptivities and cooling effects of the one or more colorants, the fusing agent, and/or the detailing agent to be applied onto the build material particles responsive to receipt of the energy; and
   determine the thermal response predicted to occur based on the determined absorptivities and cooling effects.

6. The apparatus of claim 1, wherein the instructions are further to cause the processor to:
   determine that the temperature exceeds a first predefined threshold; and
   based on the determination that the temperature exceeds the first predefined threshold, determine that the first agent composition is to include no fusing agent.

7. The apparatus of claim 6, wherein the instructions are further to cause the processor to:
   determine that the temperature falls below a second predefined threshold; and
   based on the determination that the temperature falls below the second predefined threshold, determine that the second agent composition is to include no detailing agent.

8. A method comprising:
   identifying, by a processor, a color and a geometry of a boundary portion of a three-dimensional (3D) object to be fabricated via an additive manufacturing process in which build material particles are deposited on a layer-by-layer basis and selectively fused;
   determining, by the processor, a temperature associated with the boundary portion and corresponding to a thermal response of the build material particles and one or more colorants, a fusin g ent, and/or a detailing went applied thereon to applied energy based on the color and the geometry of the boundary portion;
   selecting, by the processor and based on the temperature determined based on the color and the geometry of the boundary portion, a first composition of the one or more colorants, the fusing agent, and the detailing agent to be applied onto the build material particles to fabricate the boundary portion;
   selecting, by the processor and based on the temperature determined based on the color and the geometry of the boundary portion, a second composition of the one or more colorants, the fusing agent, and the detailing agent to be applied onto the build material particles in an external section that is adjacent to the boundary portion but that is not part of the 3D object; and
   causing, by the processor, the 3D object to be fabricated via the additive manufacturing process using the determined first agent composition for the boundary portion and the determined second agent composition for the external section,
   wherein the first agent composition and the second agent composition are selected such that the boundary portion and the external section are fabricated to have the color of the boundary portion while maintaining the external section separate from the boundary portion such that the external section is not fused with the boundary portion.

9. The method of claim 8, further comprising:
   calculating the thermal response of the build material particles and the one or more colorants, the fusing agent, and/or the detailing agent in the boundary portion in response to receipt of the applied energy; and
   determining the temperature based on the calculated thermal response.

10. The method of claim 9, further comprising:
    determining absorptivities and cooling effects of the one or more colorants, the fusing agent, and/or the detailing agent to be applied onto the build material particles responsive to receipt of the energy; and
    calculating the thermal response based on the determined absorptivities and cooling effects.

11. The method of claim 8, wherein the first agent composition and the second agent composition are selected such that the build material particles in the external section have the color, do not fuse, coalesce, or bind with the build material particles in the boundary portion during or after application of energy, and do not cool to a level that inhibits or prevents the build material particles in the boundary portion to fuse, coalesce, or bind with each other.

12. A non-transitory computer readable medium on which is stored machine readable instructions that, when executed by a processor, cause the processor to:
    identify, in a three-dimensional (3D) model, a color and a geometry of a boundary portion of a 3D object to be fabricated via an additive manufacturing process in which build material particles are deposited on a layer-by-layer basis and selectively fused;
    determine a temperature associated with the boundary portion based on the color and the geometry of the boundary portion, the temperature corresponding to a thermal response of the build material particles and one or more colorants, a fusing agent, and/or a detailing agent applied thereon to applied energy;
    select, based on the temperature determined based on the color and the geometry of the boundary portion, a first composition of the one or more colorants, the fusing agent, and/or the detailing agent to be applied onto the build material particles to fabricate the boundary portion; and
    select, based on the temperature determined based on the color and the geometry of the boundary portion, a second composition of the one or more colorants, the fusing agent, and/or the detailing agent to be applied onto the build material particles in an external section that is adjacent to the boundary portion but that is not part of the 3D object; and,
    cause the 3D object to be fabricated via the additive manufacturing process using the determined first agent composition for the boundary portion and the determined second agent composition for the external section,
    wherein the first agent composition and the second agent composition are selected such that the boundary portion and the external section are fabricated to have the color of the boundary portion while maintaining the external section separate from the boundary portion such that the external section is not fused with the boundary portion.

13. The non-transitory computer readable medium of claim 12, wherein the instructions are further to cause the processor to:
    determine absorptivities and cooling effects of the one or more colorants, the fusing agent, and/or the detailing agent to be applied onto the build material particles responsive to receipt of the energy; and
    determine the thermal response based on the determined absorptivities and cooling effects.

14. The non-transitory computer readable medium of claim 13, wherein the first agent composition and the second agent composition are selected such that the build material particles in the external section have the color, do not fuse, coalesce, or bind with the build material particles in the boundary portion during or after application of energy, and do not cool to a level that inhibits or prevents the build material particles in the boundary portion to fuse, coalesce, or bind with each other.

\* \* \* \* \*